March 9, 1954  IB JÖRGEN JACOBSEN  2,671,417
SCRAPER DEVICE FOR CHOCOLATE MOLDING MACHINES
Filed Dec. 6, 1951  3 Sheets-Sheet 1
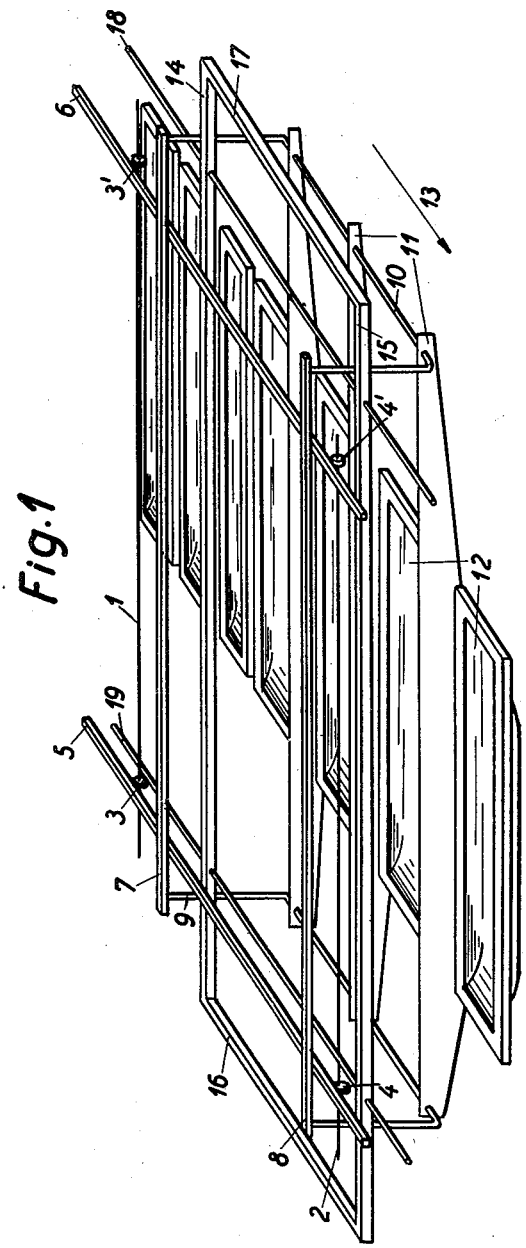
INVENTOR.
I. J. JACOBSEN March 9, 1954     IB JÖRGEN JACOBSEN     2,671,417
SCRAPER DEVICE FOR CHOCOLATE MOLDING MACHINES
Filed Dec. 6, 1951     3 Sheets-Sheet 2
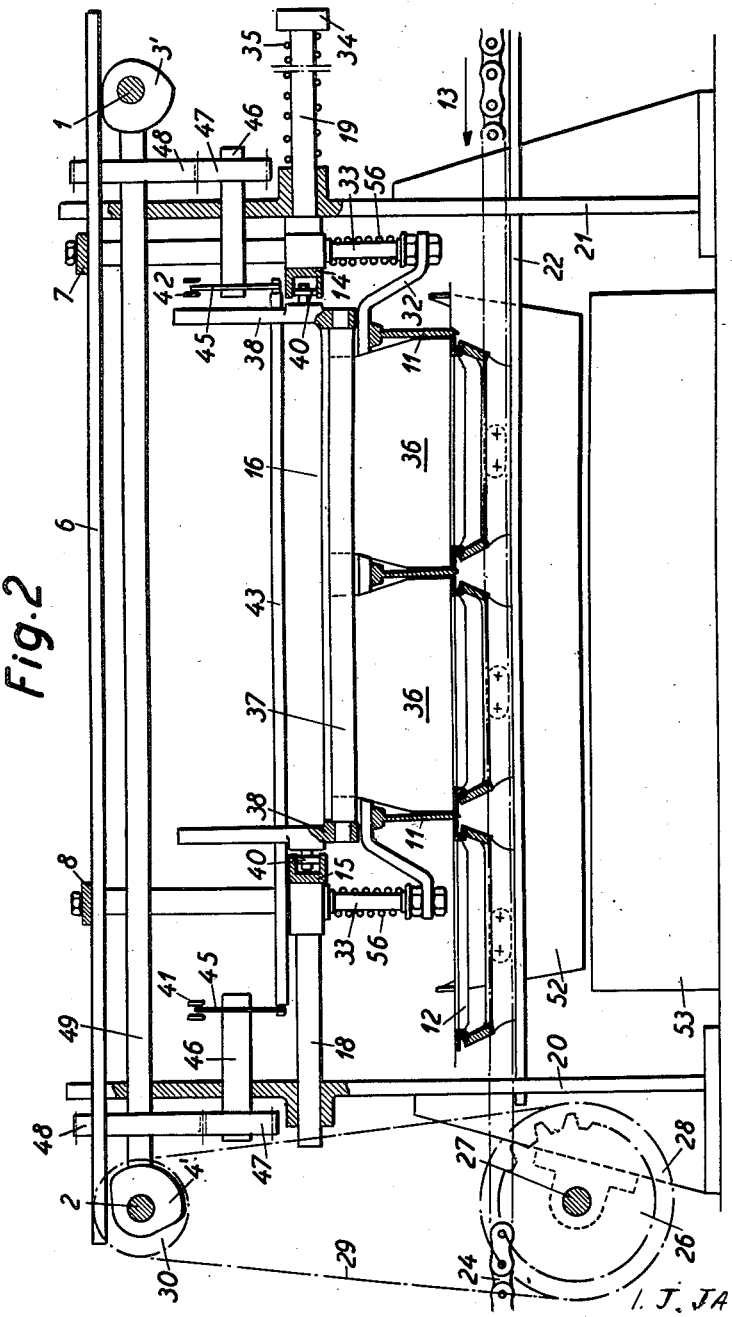
INVENTOR.
I. J. JACOBSEN
BY
ATTORNEYS

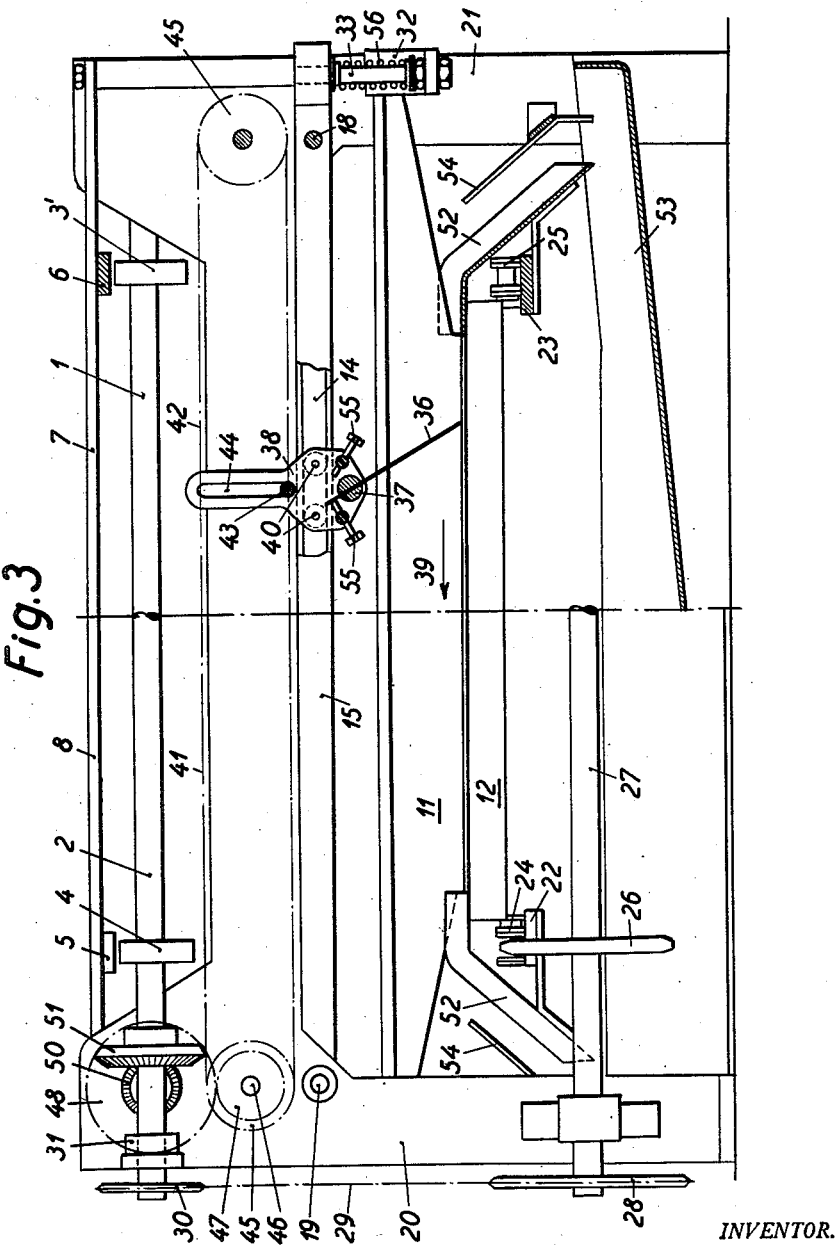

Patented Mar. 9, 1954

2,671,417

UNITED STATES PATENT OFFICE 2,671,417

SCRAPER DEVICE FOR CHOCOLATE MOLDING MACHINES

Ib Jorgen Jacobsen, Soborg, Denmark, assignor to Mikroværk A/S, Soborg, Denmark

Application December 6, 1951, Serial No. 260,286

Claims priority, application Denmark June 6, 1951

8 Claims. (Cl. 107—7)

In certain chocolate moulding operations the moulds are filled to overflow, and the excess mass must be removed after the moulding. This is, inter alia, the case in the production of filled chocolate bars which are in the last operation completed by chocolate bottoms placed on top of the fillings e. g. some cream or other, and joined by melting with the remaining part of the chocolate case or envelope which was produced in a previous moulding process. The excess bottom mass must be removed before solidification occurs, and for this purpose has hitherto been used one or more stationary scrapers mounted over the mould belt. The scraping thus effected in the longitudinal direction of the mould belt has, however, considerable drawbacks. Thus, it cannot be avoided that at any rate part of the scraped-off mass is to be carried by the scraper from one mould in the mould belt to the next mould, i. e. has to pass across the slot-shaped space between successive moulds in the belt, and part of the mass will therefore unavoidably leak down between the moulds and foul the subjacent parts of the moulding machine. The moulding mass leaking down will furthermore mean a certain waste as only part of said mass can be collected and used once more.

Another known machine is provided with a scraper chain running over a pair of sprockets and extending obliquely across the mould belt. The scrapers are here constantly moved in the same direction across the moulds, which are consequently scraped off in only one direction, and the consequence of this may be that too much moulding mass is carried along with the scrapers, so that after the scraping operation the moulds will not be quite filled at the end where the scrapers enter the moulds.

The purpose of the present invention is to remedy the above mentioned drawbacks, and the invention relates to an apparatus comprising at least one scraper for the removal of excess mass from mould belts in moulding machines for chocolate and similar masses, which apparatus is characterised in that the scraper or scrapers are mounted in a carriage, which is reciprocable in the longitudinal direction of the mould belt, said scraper or scrapers being reciprocable in relation to the carriage in the transverse direction of the mould belt. By the use of this apparatus the scraping-off of the excess mass can be performed in both directions transversely to the mould belt, and as, during the scraping operation, the scraper or scrapers can follow the motion of the mould belt on account of their mounting in a carriage movable in the direction of the mould belt, no part of the scraper or scrapers will move across the spaces between the moulds in the belt during the scraping operation. From each of the moulds the mass is scraped direct out onto a chute which is mounted along the mould belt and conveys the mass down into a suitable container which may be placed under the mould belt, and the mass scraped off will therefore have no opportunity of leaking away along undesired paths. It is an important advantage that by the use of this apparatus each of the moulds can be scraped off in both directions transversely to the mould belt. Hereby it may be ensured that when the scraping of a mould is finished, the latter is accurately filled in its full extent. The first scraping may be a rough scraping which leaves a slight excess of the mass, and this excess may by the following fine scraping be carried back over the mould for ensuring the correct filling of the latter exactly up to the plane determined by the top side of the mould. The body moulded will therefore obtain a completely even and smooth bottom.

In accordance with the invention the scraper or each of the scrapers may advantageously be mounted between two side guides located in the transverse direction of the mould belt and arranged for periodically being brought to engage the spaces between successive moulds in the mould belt in order to close said spaces. The side guides prevent the mass scraped off from escaping to the side in relation to the scraper or scrapers and thus ensure that the whole of the scraped-off quantity is carried along by the scraper out to the chute. The side guides may at the same time be used for imparting the necessary displacement motion in the longitudinal direction to the scraper carriage as will further appear from the following description of an embodiment of the apparatus in accordance with the invention.

In the drawings:

Fig. 1 shows diagrammatically a number of moulds of a mould belt on their way through the scraping apparatus of which only the side guides and their frame together with the scraper carriage (without scrapers) are shown, and Figs. 2 and 3 a side elevation and an end elevation, respectively, of the apparatus with certain parts omitted for the sake of perspicuity, and with other parts shown in cross section.

1 and 2 in Fig. 1 indicate two shafts which are accommodated in the main frame, not shown, of the apparatus, and each of which carries two cam discs, 3, 3' and 4, 4', respectively. Said cam discs carry the above-mentioned frame for the side guides of the apparatus, said frame consisting of two bars 5 and 6 mounted immediately above the cam discs 3 and 4, 3' and 4', respectively, and two other bars 7 and 8 secured to and lying at right angles to the bars 5 and 6, and two U-shaped hoops 9 and 10 which lie parallel to the bars 5 and 6 and depend from the bars 7 and 8. The hoops 9 and 10 carry the side guides 11 of the apparatus. In the drawing three of said guides are shown engaging between the moulds 12 of the mould belt. The direction of motion of said moulds is indicated by an arrow 13 and is parallel to the direction of the bars or rods 5 and 6, i. e. at right angles to the axles 1 and 2.

The vertical branches of the U-shaped hoops 9 and 10 extend through holes in two bars 14 and 15 which lie transversely to the mould belt. The ends of said bars are integral with two longitudinal bars 16 and 17, and the bars 14, 15, 16 and 17 form together the scraper carriage of the apparatus. Said carriage is carried displaceably in the direction of the mould belt by two rods 18 and 19 which are secured in the main frame and extend through holes in the bars 14 and 15.

When, as shown in Fig. 1, the side guides 11 engage between the moulds, they are carried along by the mould belt, and thus the frame 5, 6, 7, 8, 9, 10 and the carriage 14, 15, 16, 17 are also moved in association with the mould belt. During this motion the scraping-off of the excess mass from the moulds 12 takes place as will be more fully described later. Next the cam discs 3, 3' and 4, 4' are turned up into their highest position, whereby the side guides 11 are raised clear of the moulds and enable the return motion of the frame and the carriage to their initial position, e. g. under a permanently acting spring pressure.

As shown in Figs. 2 and 3, the main frame of the apparatus comprises two substantially port-shaped end walls 20 and 21 which through elements, not shown, carry two bars 22 and 23 which serve for supporting the mould belt during its passage through the apparatus. The driving chains of the mould belt are designated by 24 and 25, the chain 24 being shown in engagement with a sprocket 26 which is fast on a shaft 27 resting in brackets on the end wall 20 and carrying another sprocket 28 which through a driving chain 29 is drivingly connected to a sprocket 30 on the cam shaft 2 journalled in bearings 31 on the end wall 20, Fig. 3. The other cam shaft 1 may be driven correspondingly.

As was the case in Fig. 1 there are in accordance with Figs. 2 and 3 three side guides 11, the up- and downward motion of which is controlled by the cams, said guides being carried by longitudinal rods 32 which through vertical rods 33 are carried by the bars 7 and 8. Each of the longitudinal rods 32 with associated vertical rods 33 thus correspond to one of the hoops 9 and 10 in Fig. 1.

In Figs. 2 and 3 the bars 14 and 15 forming part of the scraper carriage are shown as U-sections with their flanges facing the centre of the carriage, and the carriage is carried displaceably by rods 18 and 19 which in Fig. 2 are rigidly connected with the carriage and are accommodated displaceably in the end walls 20 and 21 of the frame. The end of the rods 18 and 19 facing rearwards in relation to the direction of motion of the mould belt carries a head 34, and between said heads and the wall 21 the rods are surrounded by springs 35 which tend to move the carriage rearwards. The springs 35 serve for returning the carriage to the initial position shown in Fig. 2 when said carriage, on account of the engagement of the side guides 11 with the mould belt, has moved some distance together with the mould belt.

Between the three side guides 11 are mounted two scrapers 36 which through a common axle 37 are suspended rotatably in two bearers 38 which serve for imparting a reciprocating motion to the scrapers over the mould belt. During this motion the scrapers are declining with the scraping edge rearmost reckoned in the scraping direction. In Fig. 3 the momentary scraping direction is indicated by an arrow 39. Each of the scraper bearers 38 is provided with two wheels 40 which run in the U-shaped bars 14 or 15 and thus guide the motion of the scrapers in relation to the carriage. The driving mechanism for this reciprocating motion is formed by two parallel-running chains 41 and 42 carrying between them a rod 43 which is parallel to the direction of motion of the mould belt and extends through a vertical slot 44 in each of the bearers 38. Each of the chains 41 and 42 runs over two sprockets 45 on shafts 46 which are journalled in the frame of the apparatus and one of which is driven from the cam shaft 2 or 1, respectively, through a gear wheel 47 mounted on the shaft 46 and meshing with a gear wheel 48 on a shaft 49 which furthermore carries a bevel gear 50, Fig. 3, meshing with a bevel gear 51 on the cam shaft 2.

When the scrapers 36 approach one or the other of the terminal points during the scraping motion, they slide out onto one of two stationary chutes 52 which are mounted on either side of the mould belt with their upper ends extending for some distance over the side edges of the mould belt and lead the mass scraped off down into a tray or some other container 53 mounted under the mould belt. The scraper or scrapers continue their motion until the scraping edge slides down the oblique surface of the chute, and when next the direction of scraping changes on account of the fact that the rod 42 is led around one pair of sprockets 45, the shaft 37 carrying the scrapers will turn in the bearers 38, so that the scraping edge will also during the next scraping motion face rearwards. In association with each of the chutes 52 is mounted a stationary scraper 54 for cleaning the movable scraper or scrapers 36 at the termination of each scraping motion.

In Fig. 3 the bearer 38 comprises a pair of screws 55 for adjusting the scraping pressure between the scrapers 36 and the upper side of the moulds 12.

In the embodiment in accordance with Figs. 2 and 3 the side guides 11 are permanently loaded downwards against the mould belt by pressure springs 56 lying around the vertical rods 33 between the scraper carriage and the rods 32 carrying the side guides. Said springs ensure that the side guides are pressed into firm engagement between the moulds 12 so that the spaces between the latter are completely closed by the side guides for the prevention of leaking down of the mass, and this complete closing is further ensured by the cams 3, 3' and 4, 4' being kept out of contact with the bars 5 and 6 when the side guides are in their lowest position. The cams are further expediently set in such a way that during their downward motion the side guides 11 hit the rear part of the moulds and next drop down into the spaces between the moulds when said spaces reach the side guides during the motion of the mould belt in relation to the guides.

It appears from the above description that the number of scrapers in the apparatus in accordance with the invention may be chosen at wish. In the embodiment shown comprising two scrapers, which both scrape all of the moulds, the latter are first scraped in one and immediately thereafter in the other direction. The scrapers may, however, also have a larger spacing and may be arranged for individually scraping only every other mould. Another possibility of adapting the scraping to the prevailing conditions consists in that instead of a single scraper several successive scrapers may be mounted between each pair of side guides.

Many other deviations from the embodiments shown are also possible within the scope of the invention. By way of example, the side guides need not be vertically movable, the mould belt being instead arranged for being periodically raised and lowered for effecting the engagement between the side guides and the spaces between the moulds.

I claim:

1. An apparatus for removing the excess chocolate mass from continuously travelling moulds in moulding machines for cholocate and the like, comprising a stationary frame, a carriage reciprocable in said frame in a direction parallel to the travel of said moulds, means for reciprocating said carriage with a forward speed equalling the speed of travel of said moulds, at least one scraper element mounted in said carriage, and means for reciprocating said scraper element over said moulds perpendicularly to the direction of travel of the latter for strickling said moulds in both transverse directions thereof.

2. An apparatus as claimed in claim 1 wherein the means for reciprocating said carriage comprises at least one guide plate mounted in a frame structure reciprocating with said carriage, cam means for oscillating said frame relative to said carriage between a lower position in which the lower edge of said guide plate engages the space between two successive moulds, and an upper position in which said edge is situated above the upper surface of the moulds, means for driving said cam means in accordance with the forward travel of said moulds, and means for permanently loading said carriage in the direction opposite to the direction of travel of said moulds.

3. An apparatus as claimed in claim 2 wherein said frame structure carries at least two guide plates each of which extends over the full width of the moulds, each scraper element being mounted between such pair of guide plates.

4. An apparatus as claimed in claim 2 wherein the means for permanently loading the carriage comprises a spring interposed between said carriage and the stationary frame of the apparatus.

5. An apparatus as claimed in claim 1 wherein said scraper element is carried like a pendulum by two bearing elements guided for transverse to and fro displacement in the carriage, means being provided for imparting such to and fro motion to said bearing elements for drawing said scraper element across the moulds in both transverse directions thereof.

6. An apparatus as claimed in claim 5 wherein said means comprises a pair of parallel endless chains running in planes perpendicular to the direction of travel of the moulds, and a rod member extending between said chains perpendicularly to said planes and further extending through parallel vertical slots in said bearing elements.

7. In an apparatus as claimed in claim 1, a stationary chute mounted on either side of the continuously travelling moulds, said chute comprising an upper horizontal portion extending over the side edge portion of said moulds and an oblique main portion leading downwards to an excess mass collecting tray, and at least one scraper element carried like a pendulum by bearing means horizontally reciprocable across the moulds between two extreme positions in which the pendulum axis of said scraper element is situated above said oblique main portion of the particular chute.

8. An apparatus as claimed in claim 7 wherein a stationary scraper element is mounted over each of said chutes in position to engage and clean the front surface of the reciprocable scraper element before the motion thereof is returned in said extreme position.

IB JORGEN JACOBSEN.

References Cited in the file of this patent
UNITED STATES PATENTS

| Number | Name | Date |
| --- | --- | --- |
| 2,356,872 | Monaco | Aug. 29, 1944 |
| 2,509,322 | Tunley | May 30, 1950 |